STEP I
COAT THE SURFACE OF PARTICLES OF A LOW POWER LOSS EXPANDABLE SYNTHETIC RESIN WITH A DILUTE AQUEOUS SOLUTION OF A WETTING AGENT (SAID PARTICLES CONTAINING 3-30% BY WEIGHT OF A VOLATILE ALIPHATIC HYDROCARBON BOILING IN THE RANGE OF 35-60°C.)

STEP II
EXPOSE THE COATED PARTICLES TO ELECTRICAL WAVES HAVING A FREQUENCY OF 5-100 MEGACYCLES PER SECOND UNTIL SOFTENING AND EXPANSION OF THE PARTICLES OCCUR, THEREBY FORMING A FOAM

STEP III
REMOVE THE FOAM FROM THE ELECTRICAL FIELD BEFORE CHARRING OCCURS

INVENTORS.
EDWIN A. EDBERG,
RICHARD H. IMMEL.
BY J.E. Armstrong
their ATTORNEY.

3,242,238
METHOD FOR MAKING FOAMED POLYMERIC STRUCTURAL MATERIALS

Edwin A. Edberg, 56 Genesee St., Greene, N.Y., and Richard H. Immel, 1936 Crestmont Drive, Aliquippa, Pa.
Filed Apr. 12, 1961, Ser. No. 102,363
7 Claims. (Cl. 264—26)

This application is a continuation-in-part of the applicants' copending application Serial No. 705,540, filed on December 12, 1957 and now Patent No. 2,998,501.

This invention relates generally to methods of making foamed polymeric materials. In one specific aspect, it relates to a novel technique for making polymeric foam from expandable polymeric materials. In another aspect, it relates to a method of making sandwich-type panel structures comprising cellular polymeric material interposed between and affixed to facing materials.

The art of making integral low density cellular polymeric structures having uniform small voids from expandable polymeric materials is well established. One particularly useful process for making the starting expandable polymeric materials involves forming a stable aqueous suspension of the polymeric particles and impregnating the suspended particles with a volatile aliphatic hydrocarbon. Expandable polymeric materials that can be conveniently made by this process include polystyrene, polyethylene, polypropylene, alkyl-substituted styrenes, polyacrylic esters and poly-methacrylic esters; copolymers of styrene and alphamethyl styrene, copolymers of styrene and alkyl-substituted styrenes, e.g., vinyl toluene, copolymers of styrene and small amounts of divinyl benzene and copolymers of butadiene or other dienes or acrylonitrile and styrene. The expandable materials have incorporated therein from 3 to 30 parts by weight of an aliphatic or cycloaliphatic hydrocarbon boiling in the range of 35 to 60° C. Suitable hydrocarbons include for example petroleum ether, pentane, hexane, heptane, cyclopentane, cyclohexane, cyclopentadiene, and mixtures thereof. The expandable particles are generically known as beads; they may be round, pillow-shaped or irregularly shaped due to comminution.

The particular process used to produce the particles is not critical and other processes may also be used. If such other processes are used, the resulting particles may have other irregular or regular shapes such as rods, cubes, bars, etc.

Various means have been suggested for heating the beads to cause them to expand into an integral cellular polymeric structure. Hot water has been used, but such treatment is limited in its commercial application to situations wherein the material is foamed in molds, or other applications where it is not prepared in situ with facing materials of various types which would not stand exposure to water. The hot water technique is also limited with respect to time, sometimes requiring several hours to produce the foamed structure.

Infrared rays have also been used for expansion of beads. The tendency in this method is to overheat one side of the bead, thereby causing collapse of the foamed structure and increased density, the heated side having a high density and the unheated side having a low density. Difficulties are also encountered when an effort is made to form the foamed structure in situ using infrared heat.

The use of steam to promote expansion of the beads has likewise been suggested; however, there are some limitations of a steam process which have yet to be overcome. When the foam structure is formed in situ with facing materials, it is difficult to provide uniform heating of the expandable particles. Uneven heat transfer results in non-uniform expansion and poor fusion of the polymeric foam.

It has been proposed that high frequency waves be used to effect the expansion of polystyrene. Unfortunately, polystyrene and the related expandable polymeric materials approach in varying degrees the ideal dielectric. In other words, since they are virtually transparent to the power applied to them by high frequency waves, they cannot be heated to their melting point in a high frequency field.

A well known process for making cellular products from vinylidene chloride copolymers is described in U.S. 2,695,427. In that process a vinylidene chloride copolymer is combined with a blowing agent and placed in a high frequency field until the mixture attains the temperature at least as high as the softening point of the copolymer. The patentees were careful to note that their process was not applicable to materials such as polystyrene and polyethylene, since these materials do not heat to their melting point when exposed to high frequency waves.

The known methods of expanding the polymeric materials are found wanting when considered in connection with another aspect of the problem overcome by the present invention. Sandwich-type foam core panels are much in demand by the building industry. The packaging industry has been equally in need of a commercially practical method of making foam core paperboard. Heretofore, the board structures for the manufacture of shipping containers have been made of such materials as laminated kraft board and kraft liner board laminated to low grade jute, chip board filler stocks of corrugated board. The solid fiber board containers have been used with only limited success for the shipment of vegetables, meats and other perishable products that must be refrigerated in shipment because of the absorption of moisture from the melting ice by the solid fiber board. The moisture causes the paper to lose its compression strength. Thus, the boxes collapse in service rather than remain rigid to provide proper protection for the packaged contents. Similarly, the compression resistance of corrugated boxes is adversely affected by moisture. Polymer latices, e.g., polystyrene latex, have been incorporated in the pulp mass used for making sheets for corrugated boards. However, if sufficient polystyrene is incorporated into the sheets to prevent water absorption, the resulting board is so rigid that it cannot be successfully scored for folding, obviously a necessary requirement in the preparation of containers.

To overcome these difficulties a process was introduced comprising passing expandable polymeric material, interposed between sheets of paper, between heated platens, followed by a cooling step. The principal disadvantage of such a process from a commercial standpoint is the time required for heat transfer; in other words, foam formation is slow and the limited amount of board material produced per unit time makes such a process economically dubious.

We have discovered a novel method for preparing foamed polymeric materials. In one of its aspects, our method can be adapted to continuous preparation of the sandwich-type panel structures having polymeric foam as a core demanded by the building and packaging industry.

It is, therefore, an object of the present invention to provide a novel method for making polymeric foams.

It is a further object to provide methods for making sandwich-type panel structures having polymeric foam as a core.

The process is clearly illustrated in the flow diagram of the attached sheet of the drawing.

With the present invention we have found that high frequency waves may be used to transfer energy to expandable polymeric materials in such a manner that the electrical energy is immediately converted to thermal energy. The heat produced results in an almost instantaneous expansion of the polymeric material to produce an integral, cellular, low density structure having small and uniform voids.

We have indicated that previous attempts to make foam from expandable polymeric materials of the type contemplated by this invention using high frequency waves have failed because such materials do not readily accept high frequency energy. The ability of a material to undergo dielectric heating, or to accept high frequency energy, is perhaps best explained in terms of the following equation:

$$Pv = \left(\frac{watts}{in.^3}\right) = 1.41 E^2 \times f \cdot \epsilon \tan \sigma$$

wherein:

$Pv$ is the power absorbed per unit volume of material (the concentration of heat generated)
$f$ is the frequency in megacycles per second
$\epsilon$ is the dielectric constant of the material (the ratio of the capacitive current through the material to the capacitive current which would flow if the same field intensity was applied to free space)
$E$ is the electrical force in kilovolts per inch and
$\sigma$ is the phase difference between the electrical force $E$ and the electric displacement which it produces.

The value $\tan \sigma$ is called the power factor.
The product of the dielectric constant $\epsilon$, and
The power factor $\tan \sigma$ is called the power loss factor.
Only materials possessing a high power loss factor undergo dielectric heating. The generally used expandable polymeric materials, such as polyethylene or polystyrene contemplated by the present invention are characterized by a low power loss factor, perhaps because of the general symmetry of their molecular structure. For example, at a frequency of between 5 and 100 megacycles per second, these materials have a power loss factor ranging from about 0.04 to 3. On the other hand, resins such as vinyl chloride and vinyl acetate, which are inoperative for the purposes of the present invention because they tend to overheat in a high frequency field, have a power loss factor of greater than about 20 in this same frequency range.

We have discovered that the low power loss polymeric materials of the present invention may be rendered suitable for dielectric heating by treating or covering them with a high power loss factor material which is an aqueous solution of a wetting agent. When the so-treated polymers are placed in a field of high frequency waves, the high loss factor material absorbs sufficient energy to heat by molecular friction. The thermal energy thereby produced is transferred to the expandable polymeric materials to cause the formation of an integral low density cellular product having uniform small voids.

By wetting agent, or as it is sometimes referred to, surface active agent, is meant a substance which as a dilute aqueous solution readily wets a surface. The type of wetting agent useful herein is virtually unlimited. For example, suitable wetting agents includes, but are not limited to, fatty acid tertiary amine salts, e.g., triethanol amine itearate, alkyl aryl sulfonates, alkyl aryl polyether alcohols, polyglycol esters, dialkyl esters of sulfosuccinic acids, sulfated fatty acid esters, e.g., sulfate isopropyl oleate, sulfonated fatty acid esters, fatty amides and polyamides, salts of sulfate esters of alkyl phenoxy polyoxyethylene alkanols, long chain hydrocarbon sodiumsulfonates, fatty alkylol amide condensates, trialkyl amine oxides, quaternary ammonium salts, e.g., cetyl dimethyl benzyl ammonium chloride, alkyl polyoxyethylene glycol amides, sodium acyl alkyl taurates, monoalkyl biphenyl monosulfonate salts, dialkylphenyl phenol disulfonate salts, polyoxyethylene alkyl ethers and thioethers, organic polyphosphates, polymerized salts of alkyl naphthalene sulfonic acids, alkyl sulfate salts, fatty alcohol ethylene oxides, alkoxypolyglycol fatty acid esters, alkanolamine fatty acid condensates, polyoxyethylene alkyl phenols, alkyl phenoxy polyoxyethylene alcohols, mixtures of naphthenic and cresylic acids, fatty acid amide-ether derivatives, modified acyl imidazolene hydroxy, esters, carboxylic acid-alkanolamine condensates, sulfated cresylic acid, long chain betaines, polyoxyethylene esters of mixed fatty and rosin acids, polyoxyethylene triacyl alkanols, alkylated alkylene polyamines, acyl sarcosines, acyl benzene sulfonates plus alkyl amide sulfates, bis(p-tert-alkyl phenoxyethyl) sulfosuccinate salts, phosphorated higher alcohols, sodium salts of acyl toluenes, and the like.

Aqueous solutions of alkyl aryl sulfonates are examples of excellent high loss factor material. The use of aqueous solutions of this type in combination with expandable polymeric material is always quite effective.

In contrast, however, the use of water alone is not entirely effective since water fails to give the requisite uniform distribution of thermal energy throughout the polymeric material. This is especially true when a thick layer of expandable material is placed in a high frequency field. As the thickness of the layer of material in the field is increased, it becomes necessary to increase the space between the electrodes. If the frequency and power are held constant, this increase in space diminishes the strength of the high frequency field. Hence, a longer exposure time is required to attain the temperature necessary to cause softening of the polymer and formation of the polymeric foam. Unless the layer of polymeric material between the electrodes is very thin, it requires an unreasonable, from a commercial point of view, heating period of about 40–60 seconds to form polymeric foam using water alone as a high power loss factor treating material. As was stated above, this period of time is unacceptable in the commercial production of foam core material.

Obviously, the most efficient commercial process for making polymeric foam is one wherein a minimum heating time is required for expansion of the polymeric material. Time becomes especially critical when the foam is produced in the form of self-sealing continuous sheets or is disposed between facing materials, as in the manufacture of sandwich-type panels. Although a 40 second heating time represents a considerable improvement over most currently used commercial techniques, we have found that this time may be reduced to about 10 seconds or less using the method of the present invention. In this method polymeric material is coated with an aqueous solution of a wetting agent.

We have indicated that time is of paramount importance in the continuous preparation of polymeric foams and sandwich-type polymeric structural material. The heating time, or the time in which the expandable polymeric material is exposed to high frequency waves, depends upon the temperature required for foam formation and the rate at which that temperature is reached for a given material. To make the polymeric foam, the expandable material must be heated at least to a temperature range wherein softening of the polymer occurs. To avoid charring, the polymeric foam must be removed from the high frequency field before overheating occurs.

The upper and lower temperature limits will vary with the choice of polymeric material. For example, when expandable polystyrene is heated, a temperature of from about 100 to 125° C. must be attained to cause expansion and softening of the polymeric particles. Generally speaking, with regard to the upper limit, the polymeric foams should be removed from the high frequency field before a temperature of about 135–150° C. is reached.

The required temperature also varies with the density of the expandable polymeric material. For instance, when expandable polystyrene having a density of 2 lbs. per cubic foot is heated, a temperature of about 110° C. is sufficient to soften the polymer and promote expansion. If the density of the material is decreased to about 1 lb. per cubic foot, a temperature of about 120° C. is required.

For control purposes, the temperature may be physically measured during the dielectric heating step provided, however, that the thermometer is preheated and is placed in contact with the expandable polymeric material in a manner avoiding any interference with the high frequency field.

Using the method of the present invention the temperature and the rate at which it is attained may be varied in many ways. Since the expandable polymeric materials having a low power loss factor do not heat in a high frequency field, the quantity of high power loss factor material applied to them will control the rate and the amount of the dielectric heating that occurs. In applying high loss factor material to the polymer as an aqueous solution of a wetting agent, the weight ratio of treating solution to polymer necessary to attain the desired temperature generally varies from about 1:1 to 1:25. If a ratio of treating solution to polymeric material greater than 1:1 is used, the polymeric material becomes too wet, and it is difficult to remove the moisture therefrom upon subsequent expansion. If the ratio is less than 1:25, it is difficult to obtain a substantially uniform covering of the polymeric material, and uneven heating in the high frequency field results.

When a water-soluble or water dispersible wetting agent is used, the wetting agent comprises about 0.05 to 20% by weight of the treating solution. The concentration of the wetting agent in the treating solution varies considerably with the power loss factor and other physical properties of the particular wetting agent employed. For example, an alkyl aryl sulfonate is used in amounts ranging between about 0.1 to 5% by weight of the treating solution. When a polyether alcohol is used as the wetting agent, it may be present in the treating solution in amounts ranging from 0.05 to 20% by weight. Generally speaking, if less than about 0.05% wetting agent is used in the treating solution, it is difficult to obtain a substantially uniform coating of the polymeric material. Thus, in a high frequency field the treated polymeric material behaves in the same way as if it were treated with water alone. As we have indicated previously, water cannot be used effectively by itself. If more than 20% by weight of wetting agent is used, overheating and charring of the polymeric material sometimes results. Too high a concentration of wetting agent also has the effect of causing the high frequency equipment to short out.

The temperature to which the treated polymeric material is heated in a high frequency field ultimately depends upon the power absorbed per unit volume of material. In turn, as shown by the formula aforesaid, the power absorbed is dependent on the power loss factor of the material to be heated, the voltage applied and the frequnecy of the wave generated by particular equipment. (The amount of treating solution and concentration of wetting agent therein control to a marked extent the power loss factor of the treated, expandable material). A frequency of about 5 to 100 megacycles per second is suitable for purposes of the present invention.

We have already noted that the spacing of the electrodes of the high frequency equipment affects the temperature and the rate of heating. This effect can be offset by varying the frequency or the voltage.

If the expandable polymeric material is placed in molds or is interposed between facing materials in a manner hereafter described, the temperature and rate of heating of the expandable material in the high frequency field will depend to some extent upon the thickness and power loss factor of the mold and/or facing material.

In preparing expandably polymeric materials containing about 3 to 30% by weight of an aliphatic hydrocarbon boiling in the range of from 35 to 60° C. for treatment with high frequency waves, a measured portion of treating solution containing an appropriate amount of wetting agent is blended with the prescribed amount of polymer in any suitable manner. After the blending step the polymeric material, coated with a high power loss factor material, is placed in a field of high frequency waves to cause the dielectric heating. The polymeric material is removed from the field after expansion is accomplished (viz. when at least the softening point of the polymeric material is reached) and before the temperature is increased to a range wherein the foam begins to char.

Molds of various shapes can be used to contain the expandable polymeric material as it is being heated in the high frequency field. Thus, shaped articles including children's toys, cups, dishes and the like are produced in a quick and efficient manner. The mold used should be made of a low loss factor material to avoid dissipation of the high frequency energy therein. For example, such materials as wood, glass, quartz, ceramics, polymethacrylates, Teflon, polyester-impregnated glass fibers, silicone-impregnated glass fibers and the like are quite suitable.

The method of this invention also can be readily adapted to continuous operation. Continuous boards or sheets of polymeric foam produced in this manner have self-sealing surfaces, thus obviating the use of facing materials in certain applications. The boards are conveniently produced between endless belts having supporting side walls to contain the polymeric material and exert pressure during transverse expansion.

In an embodiment of this invention pre-expanded polymeric particles, capable of further expansion, may be conviently used. The pre-expanded polymeric material is prepared by controlled partial expansion of expandable beads of the type described aforesaid, supra, using hot water, infrared heat, hot air or steam. The free-flowing pre-expanded particles have extremely low bulk density. They may be expanded by the method of the present invention into products of the desired shape having substantially the same low bulk density. Using the pre-expanded particles the density of the resulting polymeric foam can be more carefully controlled. Furthermore, their use is especially advantageous in preparing the sandwich-type materials hereafter described.

The pre-expanded polymeric particles can also be prepared by the method of the present invention. Expandable particles are coated with a high loss factor material in the manner hereinbefore described. The individual particles are evenly spread over the surface of a moving belt which is passed through a high frequency field. The particles are allowed to remain in the high frequency field until they become partially foamed up; viz. until some, but not all of the expanding agent is removed therefrom. They are thereafter removed from the field and allowed to cool.

Generally speaking, a heating time of 5 to 40 seconds is sufficient to accomplish the partial expansion.

To produce the sandwich-type panel structures of the present invention, the expandable polymeric materials treated or coated with a high loss factor material in the manner described aforesaid are disposed evenly between facing materials of the desired construction material. The facing materials include both flexible and rigid sheets. Flexible sheets suitable for the preparation of the various panel structures of the invention include such materials as kraft paper, polymeric sheets, e.g., cellophane, polyethylene, high impact polystyrene, and the like and various metallic foils, e.g., aluminum foil. Similarly, various flexible materials presently used as components of container structures can be used herein. Examples of these materials include jute paperboard, chip paperboard, manila paperboard, straw paperboard and the like. Rigid sheets include plywood, light gauge aluminum, light gauge steel, hardwood board, vegetable fiberboards, cement-asbestos boards, gypsum boards, phenolic-type resin-impregnated laminates and the like.

The facing materials having the expandable polymeric material interposed therebetween are passed through a field of high frequency waves generated in a manner thereby causing a dielectric heating of the high power loss factor covering expandable polymeric particles. There is a concomitant expansion of the particles into an integral cellular structure which becomes affixed to the facing material. The facing material containing the cellular structure is thereafter cooled to cause the plastic to become rigid, thereby forming the desired sandwich-type material. Cooling may be accomplished by natural or artificial means.

In a further embodiment this invention is concerned with a modification of the technique described hereabove in which the opposed surfaces of the facing material are coated with an adhesive to provide adherence between the cellular polymeric structure and the facing material. Various adhesives can be used herein. For example, with kraft paper a conventional starch adhesive or, optionally, one modified with a urea-formaldehyde or resorcinol-formaldehyde resin to enhance water resistance works quite well. Alternatively, such adhesives as sodium silicate, polyvinyl alcohol, asphalt (molten or in an emulsion), resorcinol-formaldehyde resins, phenol-modified resorcinol-formaldehyde resins, polystyrene latices, and the like can be used. Generally speaking, elastomeric-type adhesives are quite suitable.

The present invention is further illustrated by the following examples:

EXAMPLE I

A high frequency heating unit described as model 34A–LH "Thermal Electronic Heat Generator" was obtained from W. T. LaRose and Associates, Inc., of Troy, New York and installed in the laboratory. The unit has a power output of 5 kw. and operates at a frequency of approximately 70 megacycle per second. The unit comprises essentially three sections, a power supply section, a high frequency generating section and a control section. Alternating current of 230 volts is fed to the power supply section wherein it is rectified and transformed to high voltage current. The high voltage current enters the high frequency generating section where an oscillator circuit together with a power tube generates the high frequency power. The control section consists essentially of start-stop circuits, a timer, overload relay switches and a safety interlock assembly.

Twenty-five grams of partially expanded expandable polystyrene beads were placed in a large beaker. The beads were carefully admixed with 7 cc. of an aqueous solution containing 0.3% of an alkyl aryl sulfonate sold commercially as Nacconol NRSF. The mixture of beads and solution were blended, thereby depositing a thin film of solution on each individual bead.

A red oak mold having a cavity approximately 5 inches square and 1½ inches deep was placed on a sheet of plywood ¼ inch thick. It was filled level with the blended mixture of expandable polystyrene and treating solution. The mold was covered with another piece of plywood, placed on an aluminum tray and inserted between the electrodes of the high frequency unit. The aluminum tray rested on strips of insulating material that held it at approximately ¼ inch above the ground electrode. A one-inch thick piece of high density expandable polystyrene (to serve as an air gap) was then placed on top of the mold assembly. The hot electrode was lowered until it exerted pressure on the high density polystyrene slab to provide a holding pressure on the mold assembly during formation of the polystyrene foam.

The unit was turned on and the expandable polystyrene was exposed to the high frequency field for five seconds. The foam, thus formed, was allowed to cool under the pressure exerted by the electrode for approximately three minutes. The mold assembly was removed from the unit, and foamed polystyrene was extracted from the mold.

The resulting product was a uniformly expanded low density foam having an even, compact surface.

Similar foams of polyethylene, polypropylene, and copolymers of styrene and alphamethyl styrene are made in the manner described hereinabove.

EXAMPLE II

A series of experiments were made in the manner described in Example I to determine the concentration of wetting agent in the treating solution and the amount of treating solution to be applied to a fixed quantity of expandable polymeric material.

Nacconol NRSF, an anionic detergent, was used as the wetting agent in each of the experiments. Twenty-five grams of partially expanded expandable polymeric beads having a density of 2 lbs. per cubic foot were used therewith. The data is summarized in Table I. The resulting product is described as excellent, good, fair or poor in respect of the uniformity of expansion and the evenness of the surface.

*Table I*

| Concentration of wetting agent in $H_2O$, weight percent | Volume of treating solution, cc. | Molding time, sec. | Product description |
|---|---|---|---|
| 5.0 | 3 | Shorted | |
| 5.0 | 2.8 | 4–5 | Excellent. |
| 2.0 | 5 | Shorted | |
| 2.0 | 4 | Shorted | |
| 2.0 | 3.5 | 5 | Do. |
| 2.0 | 3 | 5–6 | Do. |
| 2.0 | 2.5 | 6 | Do. |
| 1.0 | 10 | Shorted | |
| 1.0 | 5 | Shorted | |
| 1.0 | 4.6 | Shorted | |
| 1.0 | 4.2 | 5 | Good. |
| 1.0 | 3.8 | 5 | Poor. |
| 0.3 | 7 | 5 | Excellent. |
| 0.3 | 6 | 6 | Do. |
| 0.3 | 5.5 | 6 | Do. |
| 0.3 | 5 | 6 | Do. |
| 0.3 | 4 | 6 | Poor. |
| 0.3 | 4 | 8 | Good. |
| 0.3 | 3 | 8 | Poor. |
| 0.2 | 10 | 6–7 | Excellent. |
| 0.2 | 6 | 6–7 | Fair. |
| 0.1 | 10 | 8 | Excellent. |
| 0.1 | 6 | 6 | None. |

From the data given in Table I it can be concluded that the weight percent concentration of Nacconol NRSF can be varied between 0.1% and 5% with excellent results. It is understood that the above data is only exact using the fixed conditions of voltage, frequency, electrode spacing and the like described in Example I. The relationship of the concentration of the wetting agent to the heat generated per unit volume of expandable polymeric material has been previously discussed in the specification.

EXAMPLE III

A series of experiments were conducted following the procedure outlined in Examples I and II using as a wetting agent the non-ionic alkyl aryl polyether alcohol sold commercially as Triton X–100. Twenty-five grams of partially expanded expandable polymeric beads having a density of 2 lbs. per cubic foot were used therewith. The data is shown hereunder in Table II.

Table II

| Concentration of wetting agent in $H_2O$, weight percent | Volume of treating solution, cc. | Molding time, sec. | Product description |
|---|---|---|---|
| 20 | 10 | 10–11 | Good. |
| 10 | 10 | 10–11 | Do. |
| 10 | 10 | 10–11 | Do. |
| 0.2 | 10 | 10 | Excellent. |
| 0.2 | 5 | 10 | Poor. |
| 0.1 | 10 | 10 | Excellent. |
| 0.1 | 5 | 10 | None. |
| 0.05 | 10 | 10 | Excellent. |
| 0.05 | 8.4 | 10 | Do. |
| 0.05 | 7 | 10 | Do. |
| 0.05 | 6 | 10 | Poor. |
| 0.025 | 10 | 30 | Excellent. |
| 0.02 | 10 | 32 | Do. |
| 0.02 | 10 | 34 | Do. |

From the above data it can be concluded that the concentration of the polyether alcohol in the treating solution can be varied betwen 0.05 to 20% by weight using a 10 second heating time, under the conditions employed.

EXAMPLE IV

Using the procedure described in the foregoing examples a series of tests were made using a cationic wetting agent, cetyl trimethyl ammonium bromide. Twenty-five grams of partially expanded expandable polymeric beads having a density of 2 lbs. per cubic foot were used therewith. The data is summarized in Table III.

Table III

| Concentration of wetting agent in $H_2O$, weight percent | Volume of treating solution, cc. | Molding time, sec. | Product description |
|---|---|---|---|
| 2 | 6 | Shorted | |
| 2 | 5 | 5 | Excellent. |
| 2 | 4 | 5 | Do. |
| 2 | 3.8 | 5 | Do. |
| 2 | 3.0 | 6 | Do. |
| 0.3 | 6 | 6 | Do. |
| 0.3 | 4 | 6 | None. |
| 0.3 | 4.2 | 8 | Excellent. |
| 0.3 | 4 | 8 | Do. |
| 0.3 | 3 | 8 | None. |
| 0.2 | 6 | 6 | Poor. |
| 0.2 | 5 | 6 | Do. |

EXAMPLE V

Using the procedure described in Example I, a series of experiments were conducted to compare water alone and other substances having a power loss factor less than that of water. Twenty-five grams of partially expanded expandable polymeric beads having a density of 2 lbs. per cubic foot were used therewith. The results are summarized in Table IV.

Table IV

| Substance tested | Volume of treating solution, cc. | Molding time, sec. | Product description |
|---|---|---|---|
| Water | 30 | Shorted out | No product. |
| Do | 35 | do | Do. |
| Do | 40 | do | Do. |
| Ethylene glycol | 10 | 60 | Do. |
| Mineral oil | 10 | 60 | Do. |
| Ethanol | 10 | 60 | Do. |
| Isopropanol | 10 | 60 | Do. |

Of the substances tested it can be concluded that only water possesses a sufficiently high power loss factor to promote formation of the polymeric foam.

EXAMPLE VI

Following the procedure described in Example I, experiments were made using twenty-five grams of expandable polystyrene beads that had not been partially expanded. Nacconol NRSF were used as the wetting agent. The results, shown in Table V, are comparable to those of Example II, although it is indicated that a slightly higher concentration of wetting agent is required to use a heating time of 10 seconds or less.

Table V

| Concentration of wetting agent in $H_2O$, weight percent | Volume of treating solution, cc. | Molding time, sec. | Product description |
|---|---|---|---|
| 1.0 | 2 | 60 | Excellent. |
| 1.0 | 4 | 25 | Do. |
| 5.0 | 2 | Under 10 | Overheated. |

EXAMPLE VII

The procedure of Example I, with the following modifications, was used to make partially expanded expandable polystyrene. Fifteen grams of expandable beads were treated with 5 cc. of 0.3% Nacconol NRSF and placed between the electrodes on a sheet of plywood, suitably supported. The particles began to partially foam up after 10 seconds. All of the beads were suitably pre-expanded after 40 seconds.

The present invention provides a method of making continuous sheets of foamed polymeric material and continuous sandwich-type panels with faster production rates, lower operating costs and lower investment per unit of capacity. Thus foam-core paperboard and other desirable sandwich type materials can be made by a method more economical than those heretofore known. The invention is readily adaptable to the molding of thin sections and panels with interior supports of unusual configuration. The foam core of the sandwich-type panels is of more uniform density.

It is possible in utilizing the present invention to prepare panel structures with paper faces that are substantially unaffected in their compression resistance property by exposure to moisture. Thus, the wetted panel has a better retention of compression strength than presently known structures of this type. Further, the novel structure offers greater insulation to shock than does an ordinary solid fiberboard and has much better thermal insulation properties. Similarly, sandwich structures comprising facing materials of higher strength are characterized by lightweight, high strength, stiffness and superior thermal insulation. These properties are substantially unaffected by moisture.

We claim:

1. A process for preparing a foamed thermoplastic article which comprises completely filling a sealable mold with small particles of a foamed thermoplastic resin having dispersed therein, as a foaming agent, an organic liquid which boils below the softening point of the resin and which has at most a slight solvent action on the thermoplastic resin, the surfaces of substantially all of said foamed thermoplastic resin particles being coated with an aqueous solution having dissolved therein only an ionic surface active agent and passing electric waves of high frequency alternating current through the sealed mold for a period of time sufficient to convert the water of the aqueous coating carried on said foamed thermoplastic resin particles into steam and further foam said foamed thermoplastic resin particles to form a homogeneous foamed thermoplastic resin article; the mold employed in the process being fabricated from a material selected from the group consisting of polytetrafluoroethylene, glass, quartz, ceramics and polymethacrylates.

2. The process of claim 1 in which the foamed thermoplastic resin employed is a vinylidene aromatic polymer having dispersed therein, as a foaming agent, an aliphatic hydrocarbon having a boiling point of 35–60° C.; said vinylidene aromatic polymer being selected from the group consisting of (1) homopolymers of a vinylidene aromatic compound of the group consisting of styrene, alkyl substituted styrenes and (2) interpolymers of a vinylidene aromatic compound of the group set forth above and an interpolymerizable vinylidene monomer.

3. A method of treating partially expanded polymeric particles of a low power loss synthetic resin, which particles contain between 3 and 30% of a volatile aliphatic hydrocarbon which boils at a temperature of from 35–60° C. and are capable of further expansion to form a cellular polymeric structure having uniform small voids and low density, comprising: coating said particles with a dilute aqueous solution of a wetting agent, the weight ratio of particles to solution being about 25:1 to 1:1, exposing said coated particles to electrical waves having a frequency ranging from about 5 to 100 megacycles per second until softening and expansion of said particles occur, thereby forming a cellular structure of low density and uniform small voids and thereafter removing said cellular structure from the electric field prior to any charring of the foam.

4. The method of claim 3 wherein the coated particles are continuously passed through the electric field to form a cellular structure of board-like form.

5. A method of treating particles of expandable polystyrene containing from 3 to 30% of an aliphatic hydrocarbon boiling in the range of 35–60° C. to form a structure characterized by uniform small voids and low density comprising: wetting said particles with a dilute aqueous solution of a wetting agent, the weight ratio of particles to solution being about 25:1 to 1:1, exposing said wetted particles to electrical waves having a frequency range from about 5 to 100 megacycles per second until softening and expansion of the polystyrene occurs, forming a foam, and thereafter recovering said foam from the electric field prior to any charring of the foam.

6. In a method for preparing a sandwich-type panel structure, of a low density cellular polymeric material having uniform small voids, interposed between and affixed to two sheets of facing material, the steps comprising: disposing evenly between said sheets expandable polymeric particles having a low power loss factor said particles being covered with a dilute aqueous solution of a wetting agent to render said particles capable of heating in a high frequency field, exposing said particles to a field of high frequency waves to heat said particles to a temperature wherein softening and expansion occur but below a temperature wherein charring occurs, thereby forming an integral cellular structure which becomes affixed to said sheets.

7. In a continuous method for preparing a sandwich-type panel structure comprising a low density cellular polystyrene interposed between and affixed to two sheets of facing material the steps comprising: disposing evenly between said sheets expandable polystyrene particles containing 3 to 30 parts by weight of an aliphatic hydrocarbon boiling in the range of 35–60° C., said particles being uniformly wetted with a dilute aqueous solution of a wetting agent, passing said particles through a field of electric waves having a frequency of 5 to 100 megacycles per second to heat said wetted particles to a temperature wherein softening and expansion occur, but below a temperature wherein charring occurs, thereby forming an integral cellular structure with said sheets, and thereafter cooling said structure.

References Cited by the Examiner

UNITED STATES PATENTS

| | | |
|---|---|---|
| 2,459,225 | 1/1949 | Hickok. |
| 2,787,809 | 4/1957 | Stastny _____ 18—48 |
| 2,951,260 | 9/1960 | Harrison et al. |
| 3,010,157 | 11/1961 | Cizek _____ 18—48 |

ALEXANDER H. BRODMERKEL, *Primary Examiner.*

WILLIAM STEPHENSON, MICHAEL V. BRINDISI,
*Examiners.*